June 10, 1969     G. P. KNIGHT     3,449,171
METHOD OF MAKING AN ENCAPSULATED DRY BATTERY
Original Filed June 21, 1965
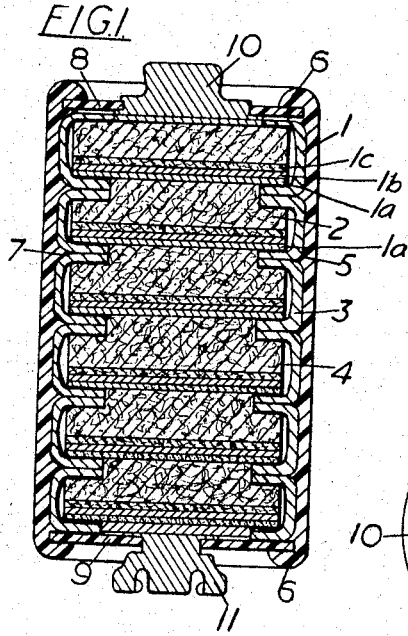
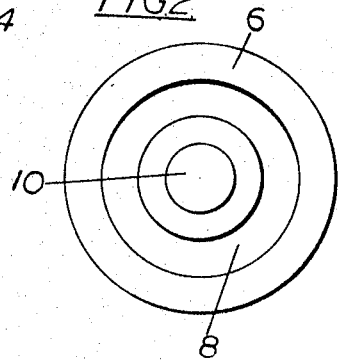
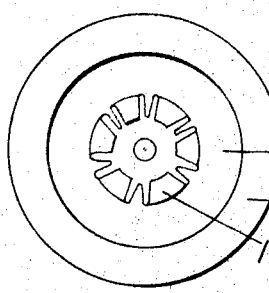
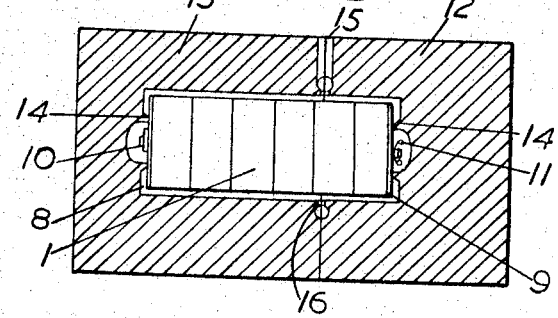
*Inventor*
GEOFFREY P. KNIGHT
By *Imisie & Smiley*
                  *Attorneys*

United States Patent Office 3,449,171
Patented June 10, 1969

3,449,171
METHOD OF MAKING AN ENCAPSULATED
DRY BATTERY
Geoffrey Peter Knight, Loughton, England, assignor to
The Ever Ready Company (Great Britain) Limited,
London, England, a corporation of Great Britain
Continuation of application Ser. No. 465,318, June 21,
1965. This application Oct. 19, 1967, Ser. No. 676,656
Claims priority, application Great Britain, June 24, 1964,
26,213/64
Int. Cl. H01m 23/04
U.S. Cl. 136—175                                       2 Claims

ABSTRACT OF THE DISCLOSURE

The invention relates to providing an encapsulating coating around a battery comprising a plurality of flat layer cells, each cell being of the type having the periphery of its bibulous elements enclosed by a deformable sheath of electrolyte impervious material. According to the invention, the cells are assembled in a mould, and plastics material which is mobile at low temperatures and pressures is injected into the mould at a pressure of less than 200 lb. per sq. in. and at a temperature which does not cause drying out of the bibulous elements.

This application is a continuation of application Ser. No. 465,318, filed June 21, 1965, which is now abandoned.

A commonly used type of galvanic dry battery consists of a plurality of cells each comprising a duplex electrode, separator and a depolarizer, the bibulous element of each cell being provided with a sheath affording a peripheral chamber about the bibulous element, the sheaths forming a seal between the cells when the latter are tied together in operative electrical series relationship thereby segregating the bibulous element in one cell from the similar element in an adjacent cell, so that seepage from one cell to another is prevented.

According to the present invention, a galvanic dry battery comprising a plurality of flat cells, each cell having a peripheral chamber surrounding the respective bibulous elements is characterized by a coating of a synthetic plastics material which is mobile at low temperatures, for example 120° C. to 130° C., produced on the battery by low pressure injection moulding.

By employing plastics of the type mentioned there is no possibility of drying out the depolarizer and there is the ensuing advantage of operating at low pressures so that the battery construction is unimpaired by the procedure.

From the foregoing it will be appreciated that the necessary electrical conductors and terminal contacts will be associated with the battery before moulding takes place and that the end walls of the mould will be shaped to receive the type of terminal contacts used to prevent them being coated in the moulding process.

The present invention ensures the assembly of cells in desired series relationship and eliminates the usual tying process and also the usual coating of the tied cells in paraffin wax.

Suitable synthetic plastic materials for use according to the invention in making a leak proof cell are low molecular weight polyethylenes, they are mobile at quite low temperatures (130° C.–180° C.) and on setting have sufficient coherence to retain the required hermetic seal over the cell to prevent loss of moisture from the depolarizer.

Furthermore, certain types of nylon as well as a copolymer of polyvinyl acetate and polyethylene ("Elvax") or mixtures of low molecular weight polyethylene with paraffin wax, for example, 50% by weight of low molecular weight polyethylene and 50% by weight of paraffin wax, can be injection moulded onto dry cells and batteries comprising the dry cells using low temperatures and pressures of the order of 100 lbs. to 150 lbs. per sq. in. not exceeding, for example, 180–200 lbs. per. sq. in. These low pressures compare with pressures of the order of 20,000 lbs. per sq. in. which are conventionally employed.

These materials have a low thermal capacity whilst the injection moulding machine, which may be water cooled for example, has a high thermal capacity so that coating materials mobile at temperatures higher than a battery or round cell could withstand if exposed to such temperatures in an oven for example, can be used because these coating materials rapidly give up their heat during the moulding process before they can injure the cell or battery. In operating in accordance with the present invention, synthetic plastics materials are chosen so that they are injection moulded onto the cell under conditions which in no way harm the cell.

In order that the invention may be clearly understood an embodiment in accordance therewith will now be described by way of example with reference to the accompanying diagrammatic drawings in which like reference numerals indicate the same or similar parts and in which:

FIGURE 1 is an elevation of a battery having a coating (shown in section) in accordance with the invention, FIGURE 2 is a plan view of the end of the battery of FIGURE 1 carrying the positive terminal, FIGURE 3 is a plan view of the other end of the battery carrying the negative terminal, and FIGURE 4 shows an elevation, in section of a mould for use in forming a coating on the battery of FIGURE 1.

Referring to the drawings, there is shown a battery comprising six flat layer-cells 1. The flat cells are of the well known Leclanche type having positive and negative electrodes 1a and 1b respectively spaced part by a separator 1c and depolarizer cake 2, the peripheral edges of which assembly are in the example illustrated enclosed in a sheath 3 formed of electrolyte-impervious material, the marginal edges of which overlap the marginal area of the carbon electrodes and the depolarizer, each cell being of tablet form. When cells so made are assembled to form a battery, the marginal edges become clamped between adjacent cells to form seals thereat. Each sheath 3 segregates adjacent cells of a battery one from the other and forms a peripheral chamber 4 for any electrolyte which may be exuded by each cell during assembly or during rapid discharge. Thus seepage of electrolyte from one cell to an adjacent cell is entirely eliminated.

In accordance with the invention, the battery is provided with a plastic coating 5 comprising a synthetic plastics material, which in the embodiment shown is a mixture of 50% by weight of low molecular weight polyethylene and 50% by weight of paraffin wax. The coating 5 is of sufficient thickness to exert an axially directed compressive force on the enclosed cells 1 sufficient to maintain the cells 1 in effective series electrical contact. The axially directed compressive force is exerted in this embodiment by integral inturned flanges 6 formed on the coating 5 and by integral internal radial ribs 7 which project into the radial interstices between adjacent cells 1.

The flanges 6 overlie carboard discs 8 and 9 which discs carry respectively the positive terminal 10 and the negative terminal 11, and which sandwich the individual cells 1 between them.

The battery is manufactured by assembling, e.g. six layer-cells 1 in series electrical contact with one another to form a 9 volt battery, together with the cardboard disc 8 and 9 carrying the terminals 10 and 11 and forming the coating 5 by injection moulding, around the peripheries of the cells to adapt the contours of said peripheries. The coating 5 is formed with the integral inturned flanges 6 and radial ribs 7 so that after the moulding operation, i.e. when the coating 5 has solidified, the inturned flanges 6 and the radial ribs 7 exert an axially directed compressive force on the enclosed cells 1 sufficient to maintain the cells in effective series electrical contact.

Although in the embodiment described the coating 5 is formed with internal ribs 7, if the assembly of layer cells presents a completely smooth and regular cylindrical surface, then the coating may be formed only with the inturned end flanges 6 to exert the necessary axially directed compressive force.

Referring now to FIGURE 4 which shows more details of the manner in which the battery of FIGURE 1 is manufactured, the six cells 1 are assembled in series face to face electrical contact sandwiched between the two cardboard discs 8 and 9 carrying the terminals 10 and 11 and are placed in a mould formed in two parts 12 and 13 which may be disengaged from each other. As will be seen from the drawings the uncoated battery is supported in the mould at the central portion of each of the discs 8 and 9 by bushes 14 which protect these central portions carrying the electrodes 10 and 11 from being coated by synthetic plastics material. Any desired area of the battery may be coated provided that the necessary axially directed compressive force is maintained but naturally as great an area of the battery as possible is protected to ensure against leakage of electrolyte therethrough.

The other parts of the battery are exposed to molten plastic which is injected at a low temperature and pressure, e.g. 100–150 lbs./sq. in., from an injection moulding machine (not shown) through the inlet 15 which encircles the mould, delivers molten plastics material into the mould via inlets 16, so that a coating having inturned flanges and radial ribs comprising a synthetic plastics material is formed on the battery. The mould maintains the battery under an end-wise pressure sufficient to maintain the cells 1 in effective series electrical contact without causing any damage to the cell structure whilst the molten plastics material is injected into the mould and after the plastics material has cooled and solidified and the parts 12 and 13 disengaged, the strength and thickness of the coating 5 is such that the flanges 6 and ribs 7 formed thereon continue to exert an axially directed compressive force on the enclosed cells 1 sufficient to maintain the cells in the series electrical contact and to cause each sheath 3 to form an expansion chamber around the periphery of each cell 1.

As will be understood the mould may be designed so that the flange 6 may have varying widths and so that it may extend over the whole area of the exposed parts of the carboard discs 8 and 9 up to the edges of the terminals 10 and 11.

As will be seen from FIGURE 1 the coating 5 formed around the cells adopts the contours of the peripheries of the cells, i.e. the coating is in intimate contact with the said peripheries and follows any micro-eccentricities. Whilst the coating is not truly adhesive it is under tension so that there is no possible passageway between the coating and the cells for the passage of electrolyte. The coating 5 does not fuse with the sheaths 3 so that they remain intact and provide the expansion chamber 4 after the moulding operation. Some deformation of the expansion chamber 4 may take place however.

The plastics material used to form the coating on the battery may be rendered opaque if desired by the addition of suitable coloring matter.

By use of the present invention there is provided a layer-cell battery in which the individual cells are maintained in intimate series electrical contact and which may be formed without the necessity of tying the cells together and dipping the tied stack manually into a bath of molten wax. The strength of the plastics material coating is such that, by the flanges and ribs, for example, integral therewith it will maintain the individual cells in series electrical contact due to the axially directed compressive force it exerts on the cells.

Furthermore, it is found that the plastics material coating prevents moisture leakage and evaporation so that the battery has a long storage life. The coating is also strong enough to withstand stresses which are produced by the swelling of the cells when the battery is subjected to rapid discharge and towards the end of the life of the battery. In fact, the coating is able to withstand prolonged storage and discharge under extreme climatic conditions.

A further advantage of the battery is that the coating is inert to, and impervious to, electrolyte so that the leakage characteristics of the battery are outstanding.

The present invention also comprehends a method of manufacturing the battery comprising the steps of assembling a plurality of cells in series electrical contact with one another together with the interconnections between the cells and terminals, and forming a coating comprising a synthetic plastics material around the peripheries of said cells to adopt the contours of said peripheries, the coating formed being of sufficient thickness to exert an axially directed compressive force on the enclosed cells sufficient to maintain said cells in effective series electrical contact.

What is claimed is:

1. A method of assembling in operative electrical series relationship and encapsulating a plurality of similar flat layer-cells of a dry battery, each cell including bibulous and non-bibulous cell elements each cell having its peripheral edges enclosed in a deformable sheath of electrolyte impervious material, said sheaths overlapping marginal areas of the cells to form seals therebetween, characterized by the steps of assembling a desired plurality of cells within a mould of a capacity sufficiently greater than the volume of the assembly to provide a clearance space for the formation of an encapsulating coating around the sheaths of the said cells capable of exerting a compressive force on the marginal overlaps of the sheaths to maintain the seals between adjacent cells and to maintain an electrical series connection between the adjacent cells, axially compressing said cells in said mould to establish electrical series contact therebetween, injecting a molten synthetic thermoplastic material into the said clearance space at a pressure not exceeding 200 lbs. per sq. in., and at a temperature in the range from 120° C. to 180° C., the said molten plastics material being selected so as to be mobile within the said temperature range, and water cooling the mould during this injection moulding operation, to maintain the temperature range during moulding and to rapidly cool the mould thereby drying out of the bibulous elements of the cell is prevented, maintaining said axial compression on the cells until after injection ceases and the coating has cooled whereby the encapsulating coating takes over the duty of exerting the compressive force required to maintain marginal seals and to ensure that the cells are held in the said series contact.

2. The method of making a dry battery which comprises:

assembling a plurality of cells in stacked relationship within a mould cavity each cell including bibulous and non-bibulous cell elements and each cell having its peripheral edges enclosed in a deformable sheath of electrolyte impervious material, said sheaths overlapping the marginal areas of the cells to form liquid seals therebetween, said cavity having a volumetric capacity to provide clearance space around the stack, axially compressing said cells thereby exerting a compressive force on the marginal overlaps of the sheaths to maintain the seals between adjacent cells and to establish electrical series contact between adjacent cells, injecting a molten synthetic thermoplastic material at a pressure not exceeding 200 pounds per square inch and at a temperature in the range of about 120° C. to 180° C. into the clearance space while maintaining said axial compressive force, said thermoplastic material being selected so as to be mobile within said temperature range, and fluid cooling the mould during the injection step while maintaining the axial compression of the cells until the material has hardened whereby the encapsulating coating takes over the duty of exerting a compressive force on the marginal overlaps of the sheaths and maintains the adjacent cells in electrical series contact.

References Cited

UNITED STATES PATENTS

| | | | |
|---|---|---|---|
| 2,272,969 | 2/1942 | French | 136—111.7 |
| 2,519,052 | 8/1950 | Reinhardt | 136—111.5 |
| 2,713,700 | 7/1955 | Fisher | 264—272 |
| 2,793,334 | 5/1957 | Robinson et al. | 264—272 |
| 2,975,482 | 3/1961 | Babcock | 136—111 |
| 3,003,012 | 10/1961 | Duddy | 136—111 |
| 3,076,052 | 1/1963 | Tamminen | 136—111 |
| 3,265,797 | 8/1966 | Spaak et al. | 264—328 XR |

ALLEN B. CURTIS, *Primary Examiner.*

D. L. WALTON, *Assistant Examiner.*

U.S. Cl. X.R.

136—132, 166